United States Patent [19]

Deloustal

[11] 4,274,674
[45] Jun. 23, 1981

[54] SAFETY SEAT FOR TRANSPORTING A CHILD IN A MOTOR VEHICLE

[75] Inventor: Bernard Deloustal, Anglet, France

[73] Assignee: Baby Relax, Anglet, France

[21] Appl. No.: 73,704

[22] Filed: Sep. 10, 1979

[30] Foreign Application Priority Data

| Sep. 11, 1978 [FR] | France | 78 26041 |
| Sep. 21, 1978 [FR] | France | 78 27039 |
| Jun. 13, 1979 [FR] | France | 79 15156 |

[51] Int. Cl.³ .............. A47C 1/026; A47C 1/027; A47D 11/00
[52] U.S. Cl. .................. 297/250; 297/363; 297/376
[58] Field of Search .......... 297/363, 364, 374, 376, 297/355, 354, 250

[56] References Cited

U.S. PATENT DOCUMENTS

| 257,873 | 5/1882 | Klein | 297/363 X |
| 1,224,263 | 5/1917 | Bolens | 297/376 |
| 1,234,402 | 7/1917 | Simmers | 297/363 |
| 2,543,167 | 2/1951 | Hening et al. | 297/364 X |
| 4,058,342 | 11/1977 | Ettridge | 297/250 |
| 4,205,877 | 6/1980 | Ettridge | 297/250 |

*Primary Examiner*—William E. Lyddane
*Attorney, Agent, or Firm*—Irvin A. Lavine

[57] ABSTRACT

The present invention relates to a safety seat for supporting and holding a child, designed to be anchored in a motor vehicle.

According to the invention, the seat has a back-rest 2 which is reclinable with respect to a seating portion 1, between two, maximum and minimum, reclining positions, and comprises side walls 1c, 2c. Two straps 9 comprising an attachment tab 20 with a part shaped as a link rod 21, extending to overlap laterally one end of the side wall 2c and one adjacent end of the side wall 1c; the link rod 20 and the side walls are provided with mutual connection means 12, 22, 23, 24, 25, adapted to cooperate when the seat is in one of the three, maximum minimum or intermediate reclining positions.

8 Claims, 5 Drawing Figures

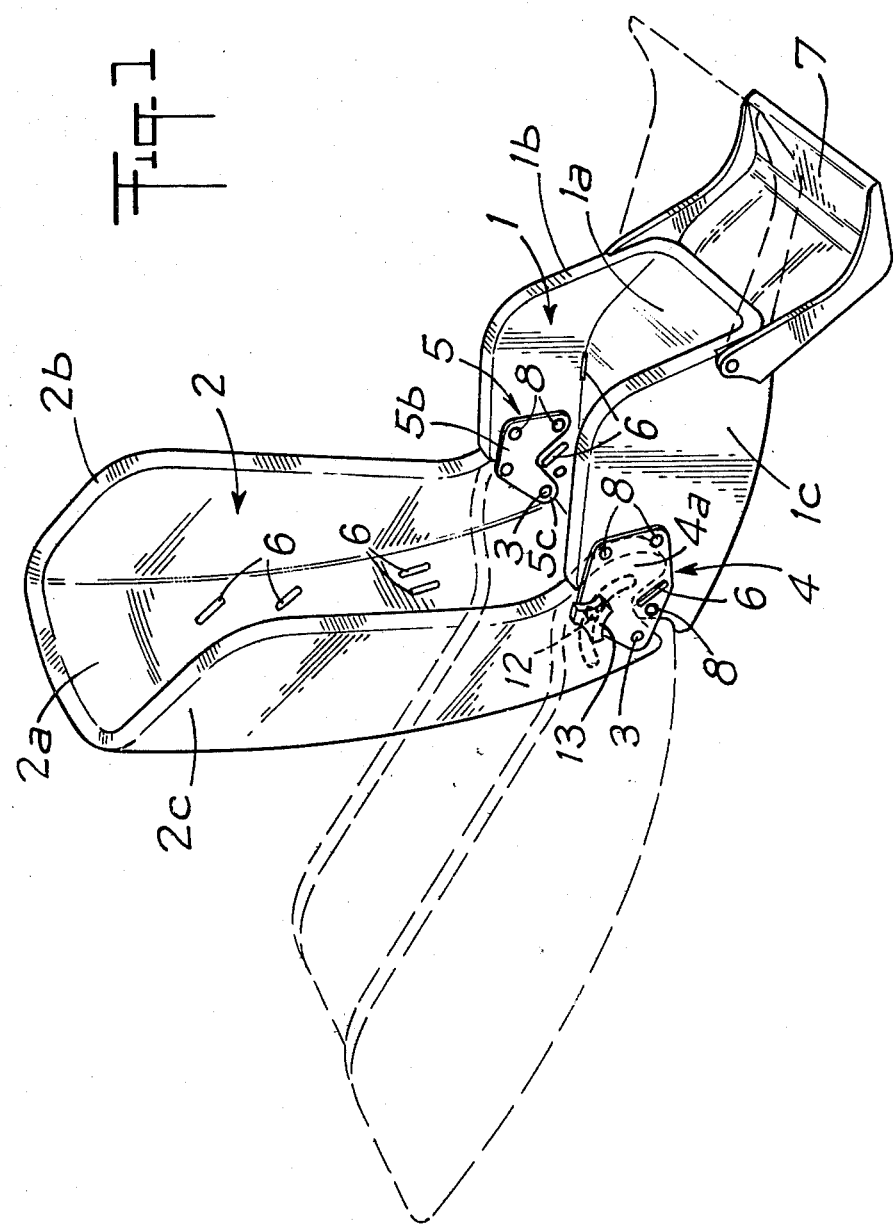

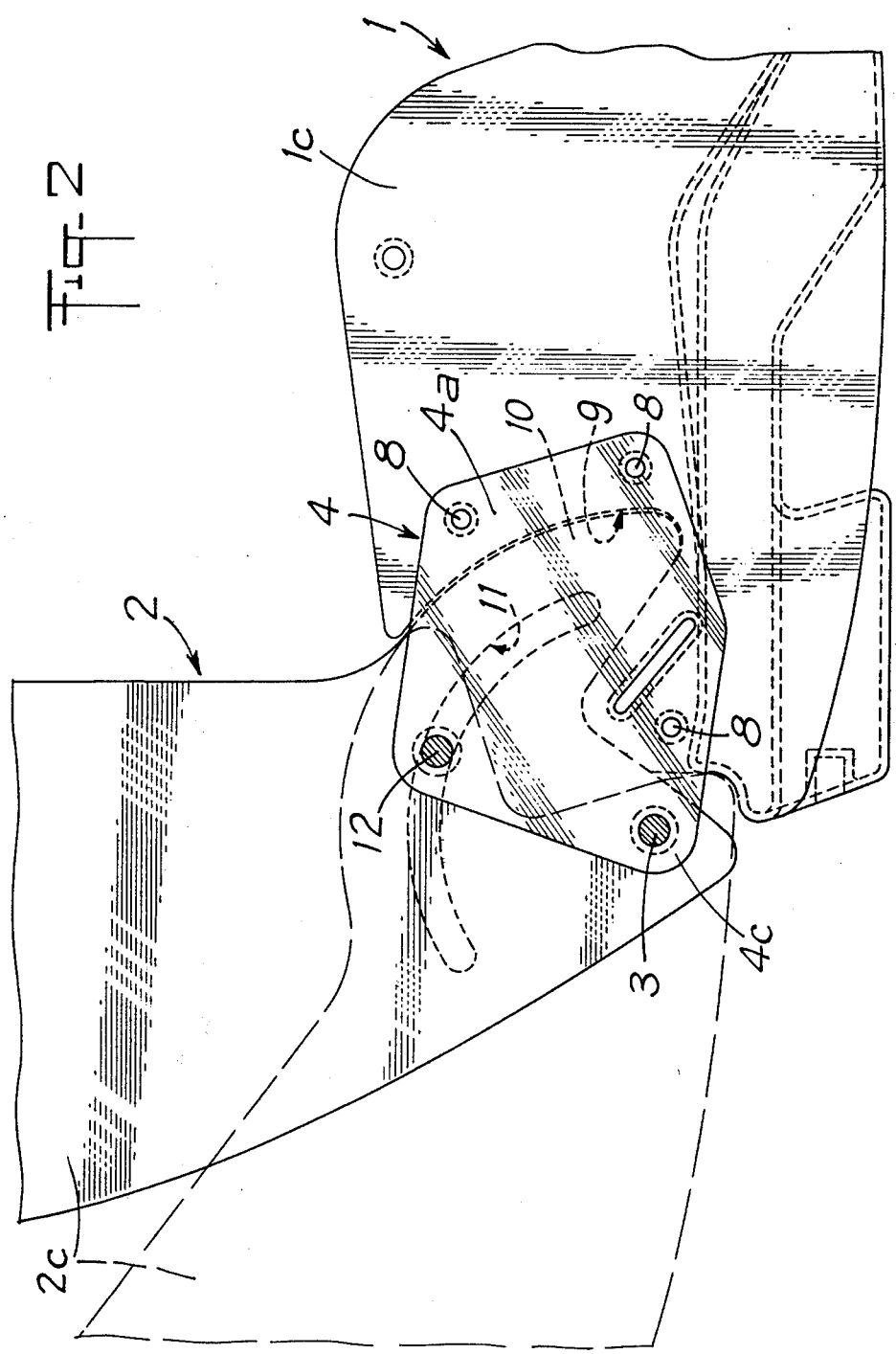

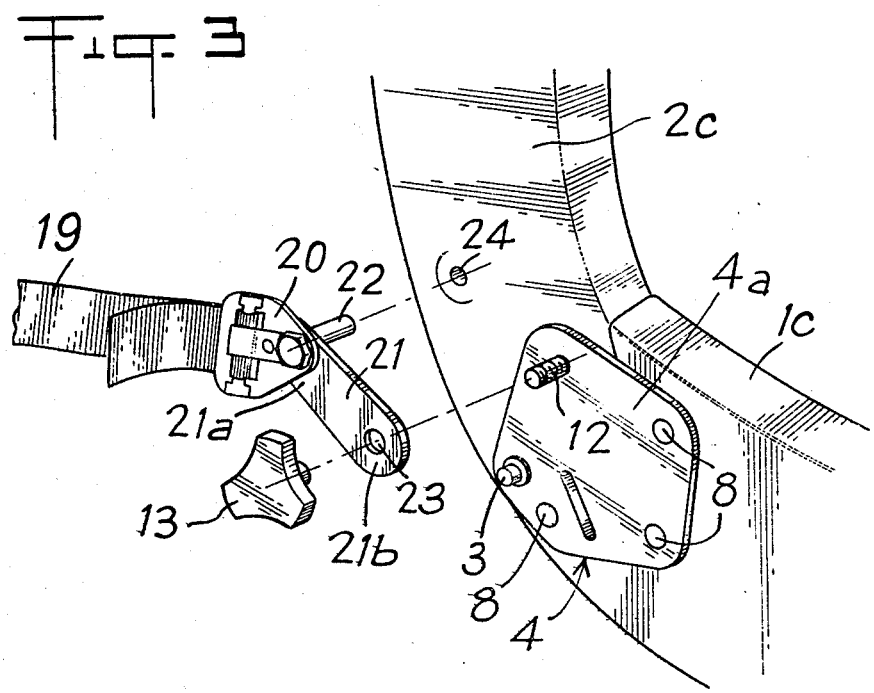
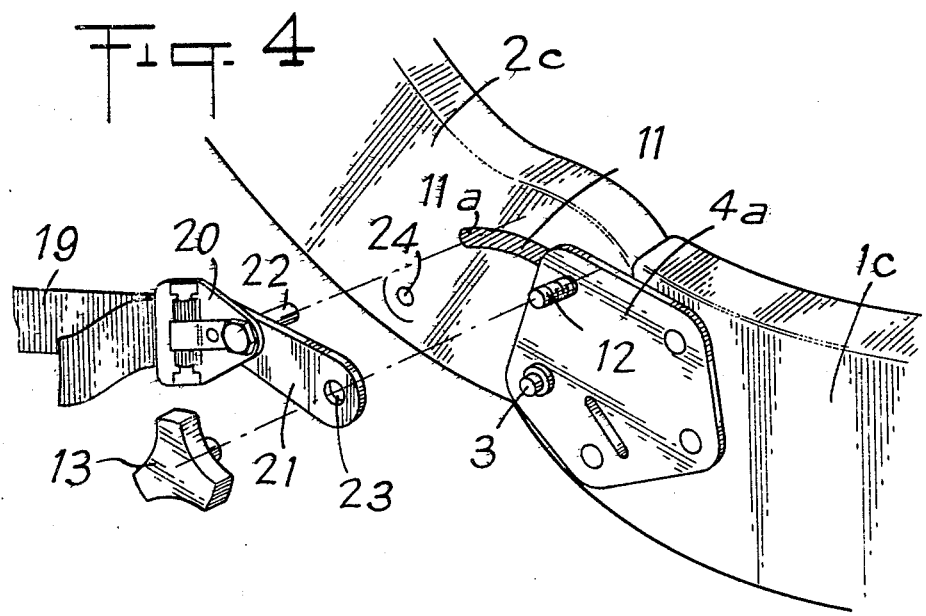

SAFETY SEAT FOR TRANSPORTING A CHILD IN A MOTOR VEHICLE

Devices are known to receive and support a child in a motor vehicle. The child should be supported in comfortable and especially safe conditions which have been the subject of a recent ruling accompanied with experiments and tests. And now all devices designed to ensure the support of a child in a motor vehicle should comply with these regulations. In view of the severity of the latter, the known devices of this kind, have been designed with that sole perspective of "safety", in order to obtain the certification necessary to their commercialization. This conception, motivated by a concern for sturdiness and strong support of the child, has led to a one-piece type of seat, secured by straps to anchoring points provided in the vehicles. These devices are clearly very special and therefore ill-suited for multiple uses. For this reason, other devices have had to be designed to fulfill the need for safe transportation of very small children unable to be kept seated in a support.

Now, one of the main qualities of any articles for children's use is that it should be able to follow the rapid growth of children.

The present invention aiming to reconcile the imperious requirements of the aforesaid regulations and the qualities of transformation or of adaptation that articles for children should have, relates to a convertible support structure for transporting a child in a motor vehicle, which structure breaks with the current ideas whereby only a "monolithic" structure can offer safety.

Thus the object of the invention is a reclining safety seat for supporting and holding a child, designed to be fitted in a motor vehicle by means of two straps adapted to be respectively stretched between a fastening point provided in the vehicle and an anchoring point found on the seat, the end of each strap being provided with a tab for its attachment to the anchoring point, the back-rest and the seating portion, which comprise side walls, being hinged together by one of their ends.

According to one main feature of the invention, the back-rest and the seating portion are each constituted by a half-shell, with the overall shape of a trough, with thick side walls, the said anchoring point being situated on one of the said walls adjacent the hinged connection; the said attachment tab comprises rigid means for coupling the side wall corresponding to the back rest with the side wall corresponding to the seat portion, for at least two reclining positions, maximum and minimum, of the seat, the said tab being fastenable to the said anchoring point only when the said coupling means are operated and lock the seat in at least the two aforesaid reclining positions.

According to one preferred embodiment of the invention, the said coupling means are constituted by a link-rod, integral with the attachment tab which can be extended to overlap laterally the adjacent parts of the walls of the back-rest and of the seating portion, corresponding elements for connecting the link-rod on the said walls being provided on the said link-rod and walls when the seat is at least in each of the two said maximum and minimum reclining positions.

More specifically, the said connection elements are constituted by a pin perpendicular to the said link-rod, provided at one of its ends and by an orifice provided in the said link-rod at its other end and by at least two orifices provided on the part adjacent the hinged connection of one of the said walls and by a pin integral with the second wall and perpendicular thereto.

Advantageously, the pin will be integral with the said threaded wall in order to constitute one of the elements to secure the said attachment tab to the seat. It will then be situated at the said anchoring point.

The seat according to the invention should further comprise means for locking the relative inclination of the two half-shells, in any position varying between the two said maximum and minimum reclining positions. To this effect, and within the field of the invention, namely that of a safety seat that should have no weakened areas, the portion situated adjacent the hinged connection of each side wall of a half-shell is provided with a nose adapted to be more or less introduced in a corresponding indentation provided in the portion situated adjacent the hinged connection of each side wall of the other half-shell according to the degree of relative inclination of the half-shells, the said means for locking the relative inclination of the half-shells being constituted by two flanks integral with each of the indented walls and laterally bordering each indentation and by clamping members for clamping the said flanks on the portion of the said nose which engages the indentation.

Preferably, each of the said clamping member is constituted by a bolt whose screw integral with one of the flanks carries at its end a clamping screw-know and crosses through the said nose via a hole in arc of circle centred on the axis of the hinged connection, and in this case, the said screw advantageously constitutes, together with the nut, the said pin and the said fastening means for the said attachment tab.

Moreover, one of the said orifices provided in the side walls is constituted by one end of the said hole shaped in arc of circle.

The seat can also have a third orifice for locking the inclination of the back-rest in a position which is intermediate between the said maximum and minimum reclining positions.

Finally, the said threaded pin will be designed to have a length at the most equal to the length of the pin carried by the link-rod.

The invention will be more readily understood on reading the description given hereunder by way of example and non-restrictively, reference being made to the accompanying drawings, in which:

FIG. 1 is a general view of an embodiment of the seat according to the invention, independently of its anchoring system.

FIG. 2 shows by a side-elevational view, one detail of FIG. 1.

FIG. 3 shows the anchoring system for the seat of FIG. 1 in its minimum reclining position.

FIG. 4 shows this same system in the maximum reclining position of the seat.

Figure 5:
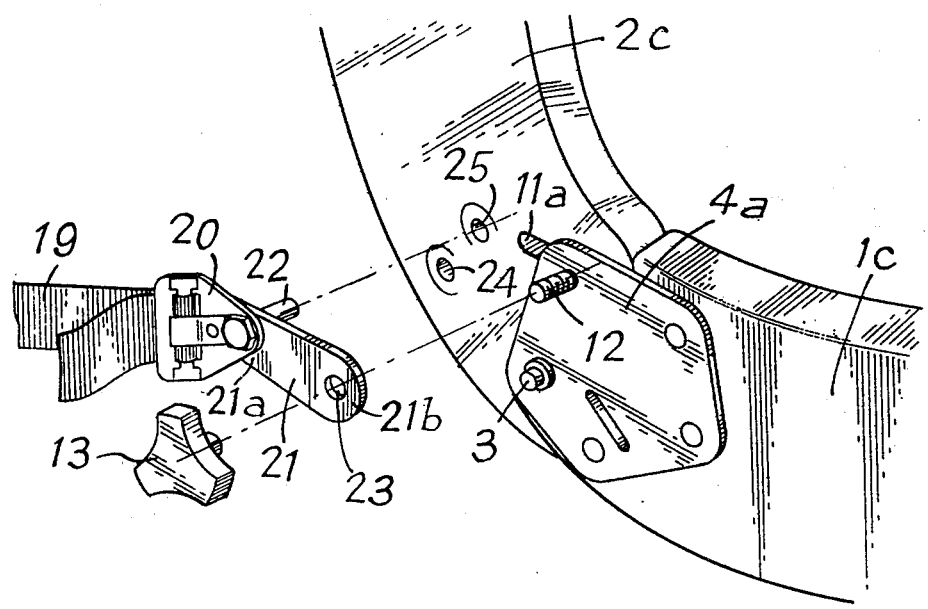
FIG. 5 shows a variant embodiment of FIGS. 3 and 4 in which an anchoring of the seat in a lockable intermediate reclining position is possible.

Referring first to FIG. 1, this shows a child's seat for anchoring in a motor vehicle. Said seat comprises two half-shells 1 and 2, each one being trough-shaped, that is to say having a base 1a, 2a and side walls 1b, 1c, 2b, 2c of substantial thickness. Said half-shells are made from a semi-rigid synthetic material.

Said half-shells are hingedly connected together by one of their ends, about axes shown as 3 in FIG. 1. The said hinged connection will be described in detail with reference to FIG. 2. Concerning this hinged connection, the relative inclination of the two half-shells 1 and 2 may be anything between two positions limit shown in continuous line and in dotted line respectively in the Figure. The first of these positions corresponds to the actual seating position in which the half-shell 2 forms the back-rest of the seat reclining by a minimum and slightly obtused angle with respect to the seating portion of the seat (half-shell 1). The second position corresponds to the reclining position which makes a bed for the infant and in which the half-shell 2 forms a maximal and substantially straight angle with the half shell 1.

The seat according to the invention is further provided with means for relatively locking the two half-shells 1 and 2 in any one of their position. These means shown in 4 and 5 in FIG. 1 are explained in detail with reference to FIG. 2 which shows a preferred embodiment thereof.

Also to be noted is the presence of slots 6 in the half-shells, through which are threaded the different straps for securing and holding the user in the seat. Finally, the seat that is illustrated is fitted with a foot-rest 7, hingedly connected in known manner, to the other half-shell 2 by a link-rod assembly not shown, and which ensures the raising up of the foot-rest simultaneously with the reclining of the structure.

FIG. 2 shows with a partial side view, one of the means 4, 5 described hereinabove as well as the hinged connection of one half-shell on the other.

It is noted, with reference to FIGS. 1 and 2 that each of side-walls 1c, 1b is provided, adjacent the hinged connection 3, with two flanks, an outside one such as 4a (which is not visible for the means 5) and an inside one 5b (which is not visible for the means 4). Said flanks thus border laterally the end of each side wall and are secured thereto by means of rivets 8 or the like. Between these two flanks, each side wall 1b, 1c is cut along an opening 9 so as to define a yoke-shaped housing.

Each side wall 2b, 2c of the other half-shell is provided, adjacent the hinged connection 3, with a nose 10, the shape of which is complementary to that of the housing 9 and adapted to more or less engage the said housing, depending on the degree of relative inclination of the two half-shells. Said nose is provided with a circular hole 11 through which passes a means for bringing the flanks one against the other thereby clamping the nose between them. Said means can be constituted by a threaded rod 12 crossing through the hole 11, secured in position for example on the inside flank and issuing beyond the outside flank so as to constitute a support for a clamping nut shaped as a control knob 13.

It is to be further noted, with reference to the Figures, that the hinged connection of the half shells is in fact produced between an extension such as 4c and 5c of the flanks of each of side walls 1b and 1c and a lower end portion of the side walls 2b and 2c extending the said extensions, the whole assembly being traversed by the corresponding axis 3 secured for example to the said extensions of the said flanks.

FIG. 2 illustrates in continuous line the seat in its minimum reclining position. It is seen that the nose 10 entirely engages the housing 9 and fits perfectly therein. The flanks are therefore clamped over a wide surface of the nose, which allows the creation of strong and widely distributed friction forces. To do this, the flanks will be chosen to be relatively flexible although very strong (certain plastics do correspond to these characteristics). The friction is advantageously improved by the "crackle" finish of the skin on the half-shells and so of the nose 10. Thus, the seat is in a solid form of equal strength without discontinuity, wherein in the same way as with the already known one-piece seats, there is no weak point liable to constitute a weakness in the seat, and preventing it from being used as a safety device.

In its maximum reclining position, shown in chain-dotted ines in FIG. 2, the half-shell 2 is virtually situated in line with the half-shell 1. The nose 10 of each side wall 2b and 2c is still partly fitted inside the housing 9 and may be clamped between the flank portions by means of the member 12, 13. Reclined this way, the seat is like a baby's bed with the necessary chararacteristics of rigidity to comply with the normal requirements prescribed for this type of articles. It further allows the fitting of an anti-ejection net, which may be for example in the form of a sock covering up the whole bed. It is to be noted on this point how important it is for the side walls 1b, 1c, 2b, 2c to be designed high enough so that sufficient space is left between the base 1a, 2a of the bed and the said net, for the baby to be comfortably installed.

FIGS. 3 and 4 show a fastening strap 19 for the seat, one end of which (not shown) is coupled to a fastening point provided in the motor vehicle, the other end being provided with an attachment tab 20 to secure it to the seat. Said tab 20 comprises a part 21 shaped as a link-rod which, in the example shown, is pivotally mounted on the table 20 about a pin 22, by one of its ends 21a. Its other end 21b is provided with an opening 23. The said link-rod 21 is long enough to laterally overlap the adjacent ends of the walls 1c and 2c of the seating portion 1 and of the back-rest 2 of the seat.

These Figures show only one device 4 for locking the back-rest 2 in a reclined position with respect to the seat portion 1. The elements constituting this device and already described hereinabove, are found here with the same reference numbers.

It will be noted that the length of the outer side portion of the screw is at the most equal to the length of the pin 22.

Finally, the edge 2c of the back-rest is provided with an orifice 24 which is meant to receive the pin 22 as hereinafter described.

When the intention is to fit the seat of FIG. 1 to a motor vehicle by means of two straps such as 19 situated on either side of the seat in its minimum reclining position (FIG. 3), the pin 22 should be inserted in the orifice 24 and simultaneously in the orifice 23 on the threaded pin 12. This operation is possible since the orifice 24 is provided in the side wall 2c so that in the minimum reclining position the distance which separates it from the screw 12 is identical to that separating the pin 22 from the orifice 23. Thus it is clear that the link-rod 21 constitutes a means for locking the back-rest in a reclined position with respect to the seat portion. In order to hold this device in position and thus fix the strap 19 to the seat, it suffices to place the control knob 13 on the screw 12.

When the intention is to lock the seat in the maximum reclining position, in order to make it into a bed (FIG. 4) the length of the hole 11 is such that the pin 22 can engage it at its end 11a when its other end is in abutment against the screw 12. The orifice 23 being then placed on the said screw, the link-rod 21 also constitutes a means for locking the back-rest in position with respect to the seat.

Referring now to FIG. 5, this shows that an orifice 25 is provided between the end 11a of the hole 11 and the orifice 24 to receive the pin 22 in an intermediate reclining position situated between the positions illustrated in the preceding figures. Such a position may indeed show some advantages in that it increases the comfort of the child who is then half lying down in his seat.

In all the other reclining positions of the back-rest 2 with respect to the seat portion 1, it is impossible for the attachment tab 20, the link-rod 21 and the knob 13 to fall into place. Indeed, if the screw 12 is introduced in the orifice 23, the pin 22 which is at least as long as the said screw comes to bear on the side wall 2c and the user rapidly notices that it is difficult for him to tighten the knob 13. Furthermore, if the pin 22 is introduced in the orifices 24, 25 or in the hole 11 there is no possible correspondence between the orifice 23 and the screw 12.

Finally the fact of having mistaken the means for controlling the reclining movement of the back-rest with the means for securing the attachment tab 20, forces one to unlock the inclination of the back-rest in order to fix the seat inside the car. As a result, and quite naturally, by trying to fix the strap to the seat, said latter is placed in one of the positions allowed for the safe transportation of the child.

The seat according to the invention, offers, by the very design of its means for locking the two half-shells, the advantage of complying with the current norms on safety, relative to seats and beds for transporting children in a motor vehicle. Such a seat can of course be fitted with multiple accessories such as legs, a flat top, carrying handles, and means for fixing it in its two positions on a push-chair frame, thereby increasing considerably its possibilities of use. It becomes thus the central and permanent core of a whole range of different articles for children's use which can answer economically to the customers' needs.

The invention is not limited to the description given hereinabove but on the contrary covers any variant that may be made thereto without departing from its scope or its spirit. In this way, the part 21 of the attachment tab 20 may be designed to be integral with the latter. Also, the pins and orifices may be carried in the reversed way by the side wall 2c and the attachment tab. Two other pins may also be provided on the side wall 1c of the seat portion to cooperate with the orifice 23, in each of the reclining positions of the seat respectively. The means for fastening the strap to the seat may also be designed so as to be separated from the means for locking the seat in the reclining positions. It is for example possible to place them where the pin 22 is or in the middle of the link-rod which in this case is provided with one or more orifices permitting a fixation in these two drifting positions. All these possible embodiments should however be such that the fitting of the strap to the seat is only made possible if the link-rod is connected to the two parts of the seat. A fastening screw shorter than the pins may be provided to this effect so that the latter cannot go through the link-rod if the pins are not received by the corresponding orifices.

The invention finds an interesting application in the field of articles for children's use.

What is claimed is:

1. A reclinable safety seat for supporting and holding a child, designed to be fitted in a motor vehicle by means of two straps adapted to be respectively stretched between a fastening point provided in the vehicle and an anchoring point found on the seat, the end of each strap being provided with a tab for its attachment to the anchoring point, the back-rest and the seating portion, which comprise side walls, being hinged together by one of their ends, wherein the back-rest and the seating portion are each constituted by a half-shell having the overall shape of a trough with thick side walls, wherein the said anchoring point is situated on one of the said walls adjacent the hinged connection, and wherein the said attachment tab comprises rigid means for coupling the corresponding side wall of the back-rest to the corresponding side wall of the seating portion for at least two maximum and minium reclining positions of the seat, the said tab being fastenable to the said anchoring point only when the said coupling means are operated and lock the seat in at least the said two reclining positions.

2. A seat as claimed in claim 1, wherein the said coupling means are constituted by a link-rod integral with the attachment tab which can be extended to overlap laterally the adjacent parts of the side walls of the back-rest and of the seating portion, corresponding means for connecting the link-rod on the said walls being provided on the said link-rod and walls when the seat is at least in each of the said two maximum and minimum reclining positions.

3. A seat as claimed in claim 2, wherein the said connecting elements are constituted by a pin perpendicular to the said link-rod provided at one of its ends and by an orifice provided in the said link-rod at its other end and by at least two orifices provided on the part adjacent the hinged connection of one of the said walls and by a pin integral with the second wall and perpendicular thereto.

4. A seat as claimed in claim 3, wherein the pin integral with the said wall is threaded and constitutes one of the elements to secure the said attachment tab on the said seat and is situated at the said anchoring point.

5. A seat as claimed in claim 4, wherein the part situated adjacent the hinged connection of each side wall of a half-shell is provided with a nose adapted to more or less engage a corresponding indentation made in the part situated adjacent the hinged connection of each side wall of the other half-shell according to a degree of relative inclination of the half-shells, and wherein the means for locking the relative inclination of the half-shells are constituted by two flanks integral with each of the indented walls and laterally bordering each indentation and by means for clamping the said flanks on the part of the said nose engaging the indentation, each of the said clamping means being constituted by a bolt whose screw thread integral with one of the flanks carries at one end a control nut or knob and traverses the said nose via a hole in arc of circle centered on the axis of the hinged connection, and wherein the said screw thread constitutes with the nut, the said pin and the said element for fastening the said attachment tab.

6. A seat as claimed in any one of claims 4 and 5, wherein the said threaded pin has a length at least equal to the length of the pin carried by the link-rod.

7. A seat as claimed in claim 5, wherein one of the said orifices provided in the side walls is constituted by one end of the said hole in arc of circle.

8. A seat as claimed in claim 5, wherein the axis of the hinged connection of the two half-shells is in two parts, each one traversing lower extensions of the said flanks and a portion of each side wall of the other half-shell placed between the said extensions.

* * * * *